US012769158B2

(12) United States Patent
Hung et al.

(10) Patent No.: US 12,769,158 B2
(45) Date of Patent: Oct. 20, 2026

(54) ELECTRO-OPTIC MODULATOR WITH WAVEGUIDE VERTICAL COUPLING

(71) Applicant: OPTILAB, LLC, Phoenix, AZ (US)

(72) Inventors: Henry Hung, Paradise Valley, AZ (US); Xiaoyan Ying, Phoenix, AZ (US); Leijun Yin, Tempe, AZ (US); Ke Huang, Phoenix, AZ (US)

(73) Assignee: OPTILAB, LLC, Phoenix, AZ (US)

( * ) Notice: Subject to any disclaimer, the term of this patent is extended or adjusted under 35 U.S.C. 154(b) by 106 days.

(21) Appl. No.: 18/821,528

(22) Filed: Aug. 30, 2024

(65) Prior Publication Data

US 2026/0063936 A1 Mar. 5, 2026

(51) Int. Cl.
*G02F 1/035* (2006.01)
*G02F 1/03* (2006.01)

(52) U.S. Cl.
CPC .......... *G02F 1/0356* (2013.01); *G02F 1/0316* (2013.01); *G02F 2202/20* (2013.01)

(58) Field of Classification Search
None
See application file for complete search history.

(56) References Cited

U.S. PATENT DOCUMENTS

| | | | | |
|---|---|---|---|---|
| 6,343,171 B1* | 1/2002 | Yoshimura | H10W 72/0198 385/24 |
| 10,921,514 B2* | 2/2021 | Iida | G02B 6/125 |
| 2016/0266322 A1* | 9/2016 | Epitaux | G02B 6/2938 |
| 2017/0207600 A1* | 7/2017 | Klamkin | H01S 5/142 |
| 2019/0265415 A1* | 8/2019 | Psaila | G02B 6/29331 |
| 2021/0193564 A1* | 6/2021 | Song | G02B 6/4214 |
| 2022/0404679 A1* | 12/2022 | Hung | G02F 1/212 |
| 2024/0345337 A1* | 10/2024 | Liu | G02B 6/4214 |
| 2025/0349794 A1* | 11/2025 | Kuo | H10W 90/00 |

* cited by examiner

*Primary Examiner* — Jerry Rahll
(74) *Attorney, Agent, or Firm* — Kilpatrick Townsend & Stockton LLP

(57) ABSTRACT

An integrated electro-optic (EO) modulator implemented on a vertical coupling platform. It features inverse taper mode converters to match spot sizes with lasers or optical fibers, microreflectors for redirecting optical paths, and microlenses for coupling to and from modulator waveguides. The modulator may be either a bulk LiNbO3 modulator or a hybrid thin-film LiNbO3 modulator, where an electro-optical modulation layer is bonded to a cladding layer overlying a substrate. A modulation zone waveguide is optically coupled to the electro-optical modulation layer and integrated with the waveguiding structure embedded in the cladding layer.

23 Claims, 4 Drawing Sheets

ELECTRO-OPTIC MODULATOR WITH WAVEGUIDE VERTICAL COUPLING

BACKGROUND

Field

This invention pertains to the field of optics, with a specific focus on the integration of laser and electro-optic (EO) modulators, utilizing high electro-optic coefficient materials such as lithium niobate, on a vertical coupling platform.

BACKGROUND

Long-haul telecommunication networks, data center optical interconnects, and microwave photonic systems heavily rely on lasers to generate the essential optical carrier for data transmission. Typically, lasers function as standalone units, separate from the modulators, leading to increased system costs and reduced stability and scalability.

Long-haul telecommunication networks, data center optical interconnects, and microwave photonic systems heavily rely on lasers to generate the essential optical carrier for data transmission. Typically, lasers function as standalone units, separate from the modulators, leading to increased system costs and reduced stability and scalability.

Recognizing these limitations and other inherent drawbacks in current technologies presents a significant opportunity for advancement. Thus, the objective of this invention is to introduce a pioneering and refined approach: integrating a laser and an electro-optic (EO) modulator, primarily based on lithium niobate, onto a unified vertical coupling platform.

Another objective of this invention is to provide a hetero-integrated electro-optic (EO) modulator, where an unpatterned, thin lithium niobate (LN) film is bonded to a silicon photonics platform, seamlessly integrated with the laser on a shared vertical coupling platform.

This advancement opens pathways for high-powered telecommunication systems, fully integrated spectrometers, optical remote sensing, and efficient frequency conversion for quantum networks, among a myriad of other applications.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to an integrated electro-optical modulator. The integrated electro-optical modulator includes: an optical modulation waveguide configured to modulate an optical signal with a received radio frequency (RF) signal to generate a modulated optical signal; an electrode configured to receive RF signal; an input waveguide configured to receive the optical signal in a substantially horizontal direction, and redirect the optical signal in a vertical direction towards the optical modulation waveguide; and an output waveguide configured to receive the modulated optical signal in the vertical direction, and redirect the modulated optical signal in the substantially horizontal direction.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. The term "substantially" as used herein accounts for tolerances in the associated parameter.

Figure 1:
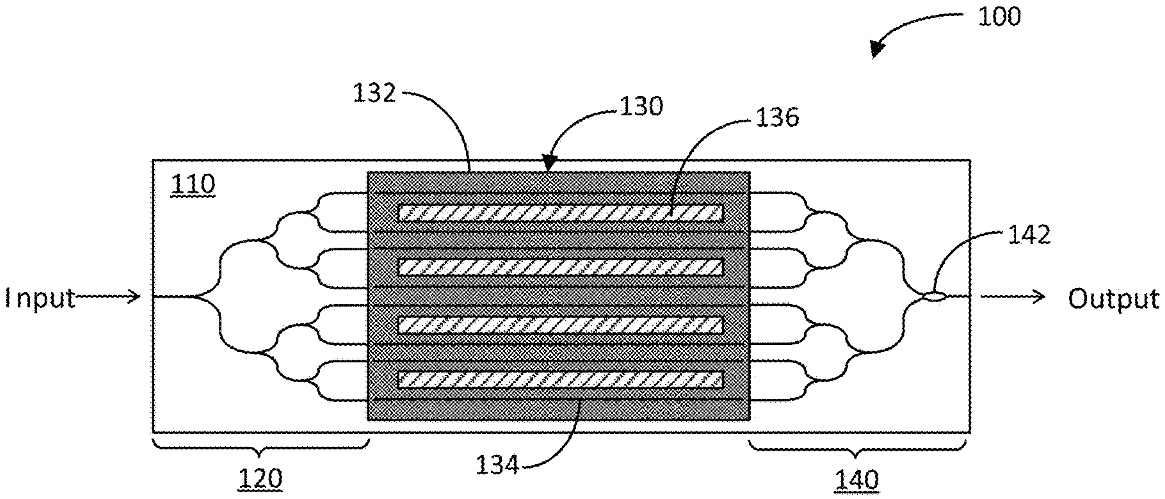
FIG. 1 illustrates a top view of example integrated electro-optic (EO) modulator in accordance with an aspect of the disclosure.

FIG. 1 illustrates a top view of an example integrated electro-optic (EO) modulator 100 in accordance with an aspect of the disclosure. The EO modulator 100 may be implemented as a dual-polarization quadrature phase shift keying (QPSK) modulator or other type of EO modulator. The EO modulator 100 includes a Silicon on insulator (SOI) substrate 110 including a set of optical splitters 120 implemented using high index waveguides (e.g., ion-exchanged glass, high refractive index polymers, silicon nitride ($Si_3N_4$), silicon oxynitride (SiON), or amorphous silicon). The set of optical splitters 120 is configured to split an input optical signal into a set of eight (8) optical signals for effectuating dual-polarization QPSK modulation of the optical signals (e.g., two (2) for polarization modulation times four (4) for QPSK modulation).

The EO modulator 100 further includes an optical modulator 130 including an optical modulating material 132, such as a bulk lithium niobate (LiNbO3), thin film lithium niobate (TFLN), or other suitable material, whose index of refraction varies with an electrical signal. The optical modulating material 132 includes a set of eight (8) optical (e.g., LiNbO3 or TFLN) waveguides 134 coupled to a set of eight (8) outputs of the optical splitter 120 for receiving the eight (8) optical signals, respectively. Additionally, the optical modulator 130 further includes a set of four (4) electrodes (electrical transmission lines) 136 extending substantially parallel with and laterally adjacent to respective pairs of the set of eight (8) optical waveguides 134. A radio frequency (RF) driver (not shown in FIG. 1) may be coupled to the set of four (4) electrical transmission lines 136 for providing thereto a set of four (4) RF signals for modulating the set of eight (8) optical signals pursuant to dual polarization and QPSK modulation.

The SOI substrate 110 may further include a set of optical combiners 140 including a polarization beam combiner 142 implemented using high index waveguides as discussed above. The set of optical combiners 140 and polarization beam combiner 142 are coupled to the set of eight (8) optical waveguides 134, and configured to combine the set of dual polarization and QPSK modulated optical signals into an output optical signal. As discussed further herein with reference to various implementations, the EO modulator 100 uses vertical optical coupling for improved component integration, improved optical performance, enhanced thermal management, reduced fabrication complexity, compatibility with existing semiconductor processes, flexible design options, and scalability of commercial viability.

Figure 2:
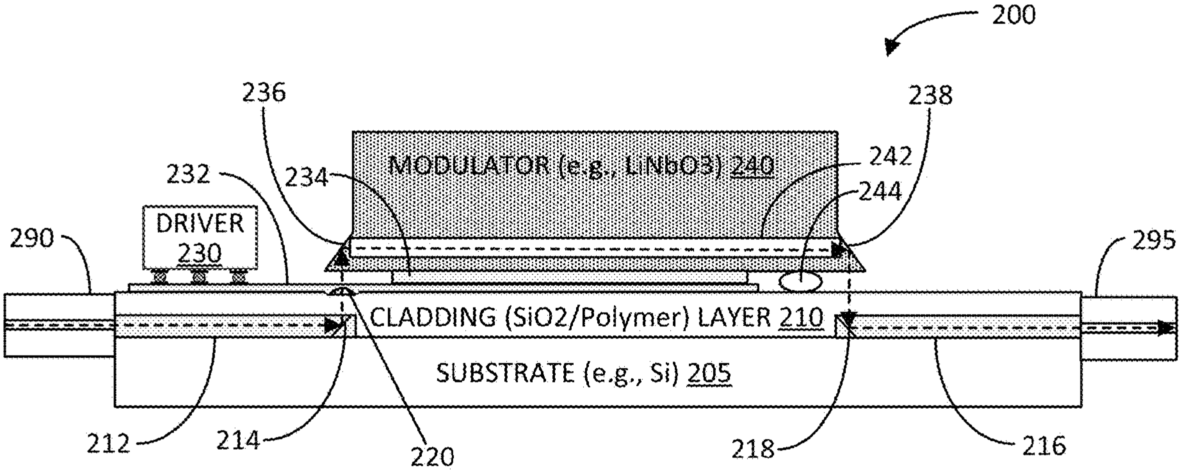
FIG. 2 illustrates a side sectional view of another example integrated electro-optic (EO) modulator in accordance with another aspect of the disclosure.

FIG. 2 illustrates a side sectional view of an integrated electro-optic (EO) modulator 200 in accordance with another aspect of the disclosure. The EO modulator 200 may an example detailed implementation of the EO modulator 100 as discussed further herein.

The EO modulator 200 includes a substate (e.g., Silicon (Si) substrate) 205 and a cladding layer (e.g., a dielectric including silicon oxide ($SiO_2$) or polymer) 210, serving as a cladding layer, disposed over the substrate 205. The EO modulator 200 further includes an input high index refraction waveguide 212 embedded between the cladding layer 210 and the substrate 205. The EO modulator 200 further includes an input single-mode optical fiber 290 optically coupled to a first (e.g., left) end of the input high index refraction waveguide 212 for providing thereto an input optical signal, as shown by the dashed arrow line. The input high index refraction waveguide 212 includes a substantially 45-degree mirror or reflector 214 (e.g., microreflector) situated at a second (e.g., right or opposite to the first) end of the input high index refraction waveguide 212. As discussed further herein, the 45-degree mirror 214 redirects the input optical signal to an upward vertical direction (as shown by the dashed arrow line) to effectuate one aspect of the vertical optical coupling.

The vertical direction is the direction upon different layers are stacked in any of the EO modulators, with generally, a substrate being situated towards the lower end or bottom of the stack. The horizontal direction is perpendicular to the vertical direction, and extends within a particular layer unless some layers are oriented laterally side-by-side. As used herein, a redirection of an optical signal propagating in a substantially horizontal direction to a vertical direction refers to any device (e.g., mirror, reflector, tapered mode converters or waveguides, etc.) that redirects the substantially horizontal propagating optical signal upwards or downwards for propagation in a different layer above or below the current layer in which the signal is propagating substantially in the horizontal direction. As used herein, a redirection of an optical signal propagating in a vertical direction to a substantially horizontal direction refers to any device (e.g., mirror, reflector, tapered mode converters waveguides, etc.) that redirects the vertically propagating optical signal to substantially horizontal direction for propagation via a particular layer.

The EO modulator 200 incorporates a lens 220 (e.g., focusing microlens) positioned above the 45-degree mirror 214 to direct the input optical signal towards another 45-degree mirror or reflector 236, which is created (for instance, using an optional dicing blade) on an internal surface of an optical modulator 240, such as TFLN or bulk LiNbO3. The lens 220 may reside or be formed within the top portion or surface of the cladding layer 210 (SiO2). Situated at the input (left) side of the optical modulator 240, the 45-degree mirror 236 redirects the input optical signal for substantially horizontal propagation through an optical modulation waveguide 242 formed within the optical modulator 240, as illustrated by the horizontal dashed arrow line. The lens 220 could additionally reduce the mode field diameter (e.g., spot size) of the input optical signal, facilitating its efficient coupling into the optical modulation waveguide 242. This adjustment may be necessary because the diameter of the optical modulation waveguide 242 may be smaller than the mode field diameter of the input optical signal before passing through the lens 220.

The optical modulator 240 further includes another substantially 45-degree mirror or reflector 238, situated at the output (right) side of the optical modulation waveguide 242, for redirecting the now-modulated optical signal to a substantially downward vertical direction (as shown by the dashed arrow line) to effectuate another aspect of the vertical optical coupling. The EO modulator 200 further includes an output high index refraction waveguide 216 embedded between the dielectric ($SiO_2$) layer 210 and the substrate 205. The output high index refraction waveguide 216 includes a substantially 45-degree mirror or reflector 218 (e.g., microreflector) that redirects the vertically-propagating modulated optical signal in a substantially horizontal direction for propagation via the high index refraction waveguide 216 to an output single-mode optical fiber 295.

With regard to the electrical side, the EO modulator 200 includes an RF driver 230 flip-chip bonded disposed on electrodes 232 fabricated on the top surface of the cladding layer 210. The electrically conductive layer 232 extends to below a significant portion of the optical modulator 240, and electrically couples to an electrode (electrical transmission line) 234 situated on the surface of the optical modulator 240, and extending substantially parallel with the optical modulation waveguide 242. The RF driver 230 is configured to generate an RF signal, which is provided to the optical modulator 240 via the electrically conductive layer 232 and the electrode 234. The RF signal modulates the optical signal propagating via the optical modulation waveguide 242 of the optical modulator 240. The optical modulator 240 may be disposed on and attached (e.g., bonded) to the cladding layer 210 using epoxy 244 for active alignment of the optical modulator 240.

Figure 3:
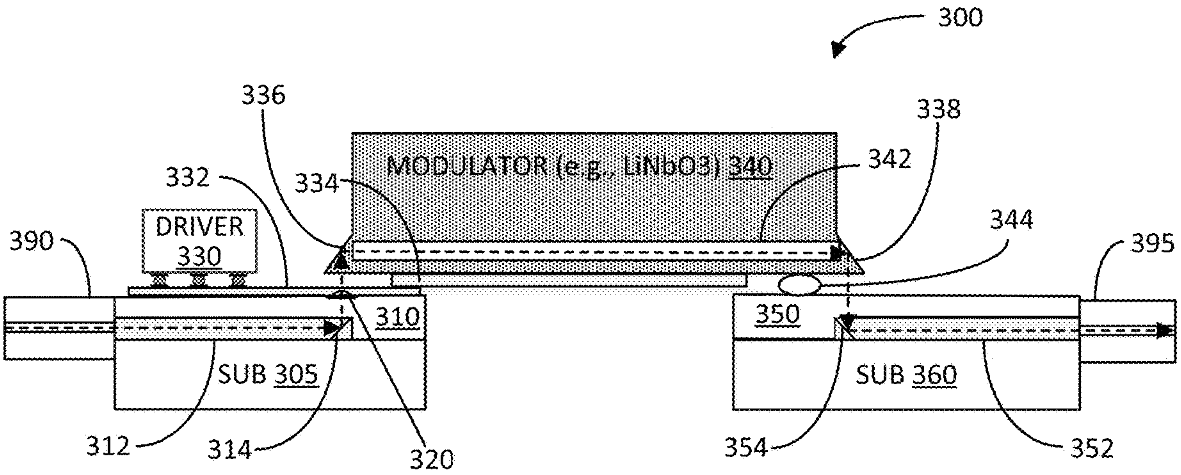
FIG. 3 illustrates a side sectional view of another example integrated electro-optic (EO) modulator in accordance with another aspect of the disclosure.

FIG. 3 illustrates a side sectional view of another example integrated electro-optic (EO) modulator 300 in accordance with another aspect of the disclosure. In summary, the EO modulator 300 is a variation of the EO modulator 200, where the substrate and dielectric layer are separated into two parts. A first substrate/cladding layer pair may be partially situated below a left portion of an optical modulator. A second substrate/cladding layer pair may be partially situated below a right portion of the optical modulator. These features facilitate integration of optical modulators of different lengths using the vertical coupling features previously discussed.

The EO modulator 300 includes a first substate (e.g., Si substrate) 305 and a first cladding layer (e.g., a dielectric including $SiO_2$ or polymer) 310 disposed over the first substrate 305. The EO modulator 300 further includes an input high index refraction waveguide 312 situated between the first cladding layer 310 and the first substrate 305. The EO modulator 300 includes an input single-mode optical fiber 390 optically coupled to a first (e.g., left) end of the input high index refraction waveguide 312 for providing thereto an input optical signal, as shown by the dashed arrow line. The input high index refraction waveguide 312 includes a substantially 45-degree mirror or reflector 314 (e.g., microreflector) situated at a second (e.g., right or opposite the first) end of the input high index refraction waveguide 312. As discussed further herein, the 45-degree mirror 314 redirects the input optical signal in an upward vertical direction (as shown by the dashed arrow line) to effectuate one aspect of the vertical optical coupling.

The EO modulator 300 includes a lens 320 (e.g., a focusing microlens) situated above the 45-degree mirror 314 for directing the input optical signal to another substantially 45-degree mirror or reflector 336 formed (e.g., using an optional dicing blade) at an internal surface of an optical (e.g., TFLN or bulk LiNbO3) modulator 340. The lens 320 may be situated or formed within a top portion or surface of the first cladding layer 310. The 45-degree mirror 336, situated at the input (left) side of the optical modulator 340, redirects the input optical signal in a substantially horizontal direction for propagation via an optical (e.g., LiNbO3 or TFLN) modulation waveguide 342 formed within the optical modulator 340, as shown by the horizontal dashed arrow line. The lens 320 may also change (e.g., decrease) a mode field diameter (e.g., spot size) of the input optical signal for efficiently coupling the input optical signal into the optical modulation waveguide 342, as previously discussed.

The optical modulator 340 further includes another substantially 45-degree mirror or reflector 338, situated at the output (e.g., right) end of the optical modulation waveguide 342, for redirecting the now-modulated optical signal in a downward vertical direction (as shown by the dashed arrow line) to effectuate another aspect of the vertical optical coupling. The EO modulator 300 further includes a second substrate (e.g., Si substrate) 360 including a second cladding (e.g., a dielectric including ($SiO_2$ or polymer) layer 350 disposed over the second substrate 360. An output high index refraction waveguide 352 is situated between the second cladding layer 350 and the second substrate 360. The output high index refraction waveguide 352 includes a substantially 45-degree mirror or reflector 354 (e.g., microreflector) that redirects the vertically-propagating modulated optical signal in a substantially horizontal direction for propagation via the high index refraction waveguide 352 to an output single-mode optical fiber 395.

With regard to the electrical side, the EO modulator 300 includes an RF driver 330 disposed on an electrically conductive (e.g., metal) layer 332 disposed on the top surface of the first cladding layer 310. The electrically conductive layer 332 extends to below a first (e.g., left) portion of the optical modulator 340, and electrically couples to an electrode or transmission line 334 situated on the underside of the optical modulator 340, and extending substantially parallel with the optical modulation waveguide 342. The RF driver 330 is configured to generate an RF signal, which is provided to the optical modulator 340 via the electrically conductive layer 332 and transmission line 334. The RF signal modulates the optical signal propagating via the optical waveguide 342 of the optical modulator 340. The optical modulator 340 may be disposed on and attached (e.g., bonded) to the first and second cladding layers 310 and 350 using epoxy 344 for active alignment of the optical modulator 340. As shown, the first substrate 305 and first cladding layer 310 are horizontally spaced apart from the second substrate 360 and the second cladding layer 350.

Figure 4:
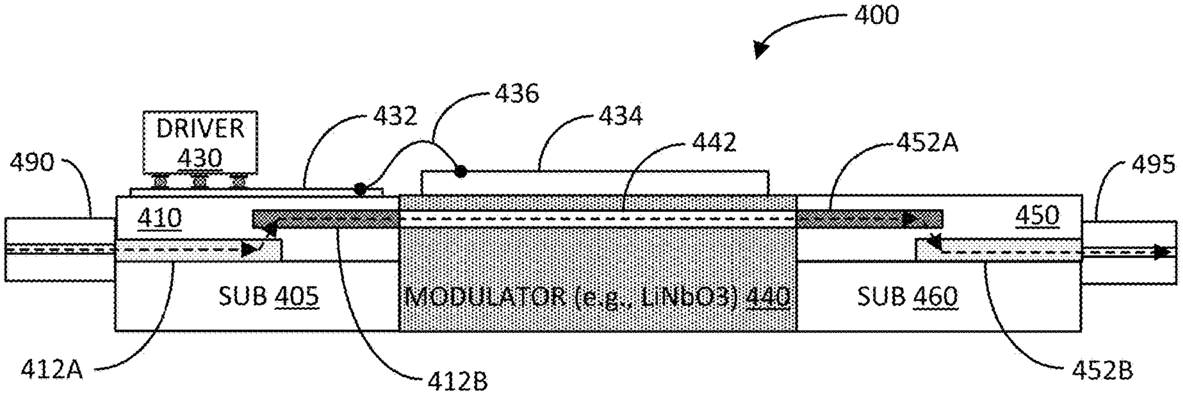
FIG. 4 illustrates a side sectional view of another example integrated electro-optic (EO) modulator in accordance with another aspect of the disclosure.

FIG. 4 illustrates a side sectional view of another example integrated electro-optic (EO) modulator 400 in accordance with another aspect of the disclosure. In summary, the EO modulator 400 is a variation of the EO modulator 300, where a first substrate/cladding layer pair, an optical modulator, and a second substrate/cladding layer pair are substantially horizontally aligned.

The EO modulator 400 includes a first substate (e.g., Si substrate) 405 and a first cladding layer (e.g., a dielectric including $SiO_2$ or polymer) 410 disposed over the first substrate 405. The EO modulator 400 further includes an input optical coupler 412A/412B situated between the first cladding layer 410 and the first substrate 405. The input optical coupler 412A/412B may be implemented using a high index waveguide. The EO modulator 400 includes an input single-mode optical fiber 490 optically coupled to a first (e.g., left) end of a first waveguide 412A of the input optical coupler 412A/412B for providing thereto an input optical signal, as shown by the dashed arrow line. The second (e.g., right) end portion of the first waveguide 412A is situated below a first (e.g., left) end portion of the second waveguide 412B of the input optical coupler 412A/412B. The second (e.g., right) end portion of the second waveguide 412B of the input optical coupler 412A/412B is substantially horizontally aligned with an optical (e.g., LiNbO3 or TFLN) modulation waveguide 442 of an optical (e.g., bulk LiNbO3 or TFLN) modulator 440.

The first waveguide 412A of the input optical coupler 412A/412B directs the input optical signal from the optical fiber 490 towards its second (e.g., right) end in a substantially horizontal direction, and then redirects the input optical signal at its second end in an upward vertical direction towards the first (e.g., left) end of the second waveguide 412B of the input optical coupler 412A/412B, as shown by the dashed arrow line to effectuate one aspect of the vertical optical coupling. The second waveguide 412B of the input optical coupler 412A/412B redirects the input optical signal in a substantially horizontal direction towards the optical modulation waveguide 442 of the optical modulator 440 (as shown by the dashed arrow), while at the same time, serving as a mode converter to change (e.g., decrease) the mode field diameter (e.g., spot size) of the input optical signal for efficient coupling into the optical waveguide 442 of the optical modulator 440. The optical signal propagates from an input (e.g., left) end to a second (e.g., right) end of the optical waveguide 442 (as shown by the dashed arrow) while being modulated with an RF signal, as discussed further herein.

The EO modulator 400 includes a second substate (e.g., Si substrate) 460 and a second cladding layer (e.g., a dielectric including $SiO_2$ or polymer) 450 disposed over the second substrate 460. The EO modulator 400 further includes an output optical coupler 452A/452B situated between the second cladding layer 450 and the second substrate 460. A first (e.g., left) end of the first waveguide 452A of the output optical coupler 452A/452B is optically coupled to the optical modulation waveguide 442 of the optical modulator 440 for receiving therefrom the modulated optical signal, as shown by the dashed arrow line. The second (e.g., right) end portion of the first waveguide 452A of the output optical coupler 452A/452B is situated above a first (e.g., left) end portion of the second waveguide 452B of the input optical coupler 452A/452B.

The first waveguide 452A of the output optical coupler 452A/452B directs the modulated optical signal from its first (e.g., left) end towards its second (e.g., right) end in a substantially horizontal direction, and then redirects the input optical signal at its second end in a downward vertical direction towards the first (e.g., left) end of the second waveguide 452B of the output optical coupler 452A/452B, as shown by the dashed arrow line to effectuate one aspect of the vertical optical coupling. The second waveguide 452B of the output optical coupler 452A/452B directs the vertically-propagating modulated optical signal in a substantially horizontal direction towards its second (e.g., right) end while at the same time, serving as a mode converter to change (e.g., increase) the mode field diameter (e.g., spot size) of the output optical signal for improved coupling into a single-mode output single-mode optical fiber 495, as shown by the dashed arrow.

With regard to the electrical side, the EO modulator 400 includes an RF driver 430 disposed on an electrically conductive (e.g., metal) layer 432 disposed on the top surface of the first cladding layer 410. A wire bond 436 electrically couples the electrically conductive layer 432 to an electrode (electrical transmission line) 434 disposed over the optical modulator 440. The electrode (electrical transmission line) 434 extends substantially parallel with the optical modulation waveguide 442. The RF driver 430 is configured to generate an RF signal, which is provided to the optical modulator 440 via the electrically conductive layer 432 and electrode 434. As discussed, the RF signal modulates the optical signal propagating via the optical modulation waveguide 442 of the optical modulator 440.

Figure 5:
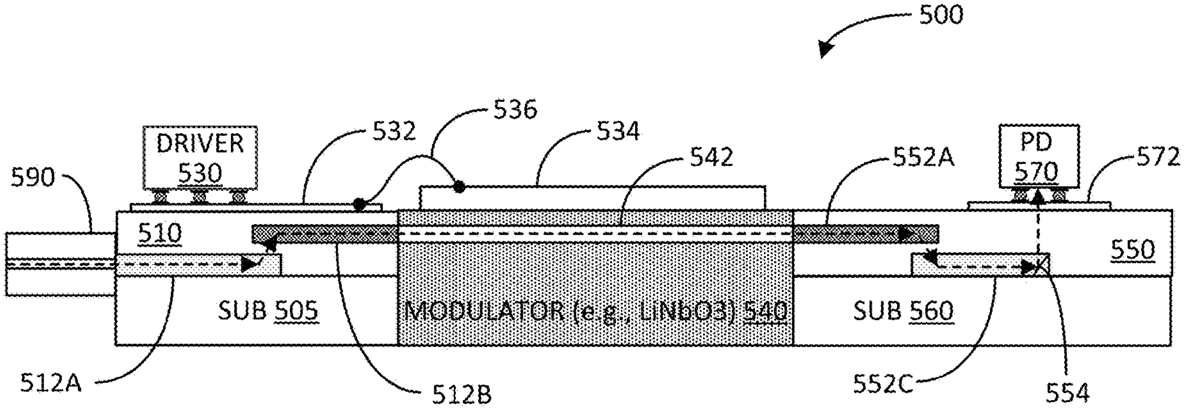
FIG. 5 illustrates a side sectional view of another example integrated electro-optic (EO) modulator in accordance with another aspect of the disclosure.

FIG. 5 illustrates a side sectional view of another example integrated electro-optic (EO) modulator 500 in accordance with another aspect of the disclosure. The EO modulator 500 is a variation of the EO modulator 400, and includes many of the same/similar elements thereof as indicated by the same reference numbers with the exception that the most significant digit is a "5" in the case of EO modulator 500 as opposed to a "4" in the case of EO modulator 400.

The EO modulator 500 differs from EO modulator 400 in that it includes a modified optical coupler 552A/552C. In particular, the second waveguide 552C of the modified optical coupler 552A/552C includes a substantially 45-degree mirror or reflector 554 (e.g., microreflector) for at least partially redirecting the horizontally propagating modulated output optical signal in an upward vertical direction towards a photodetector (PD) 570. The PD 570 is coupled to an electrically conductive layer 572 disposed on the second cladding layer 550. The PD 570 generates an electrical signal (e.g., current) that is based on a power level of the output optical signal.

Figure 6:
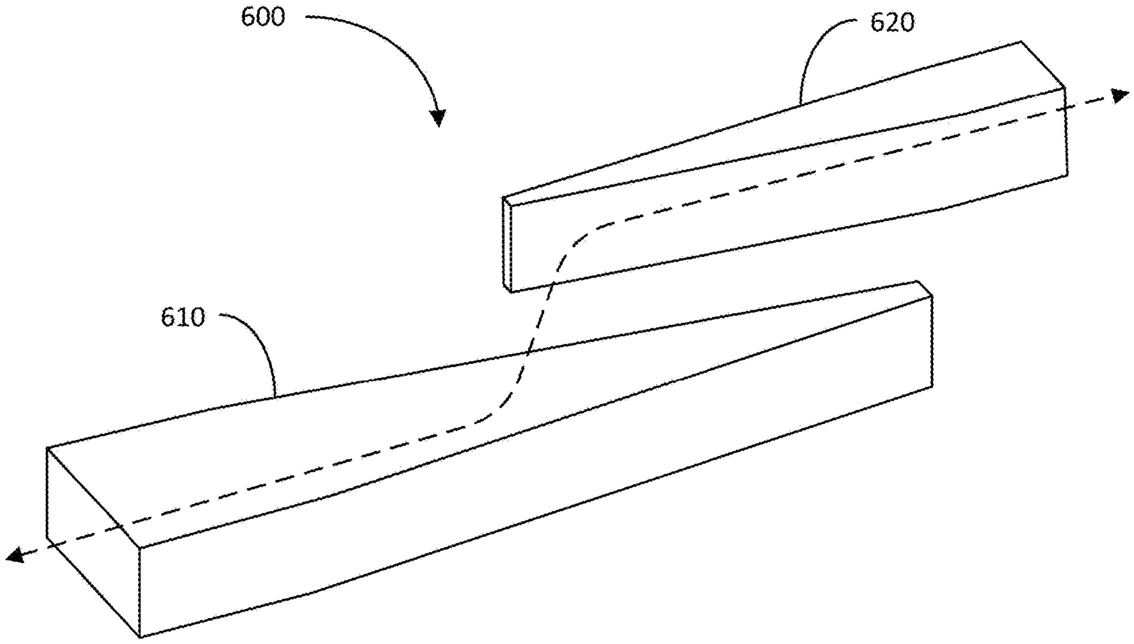
FIG. 6 illustrates a perspective view of example optical coupler in accordance with another aspect of the disclosure.

FIG. 6 presents a perspective view of an example optical coupler 600, representing another aspect of the disclosure. The optical coupler 600 serves as a more detailed implementation of the previously discussed optical couplers 412A/412B, 452A/452B, 512A/512B, and 552A/552C (where 552C includes the additional 45-degree mirror 554 previously discussed). Essentially, the optical coupler 600 achieves the mode field conversion of an input and output optical signal, respectively. Specifically, it comprises an inverse tapered high-index waveguide 610 and a tapered high-index waveguide 620. As depicted, the narrower segment of the inverse tapered high-index waveguide 610 is positioned beneath the narrower segment of the tapered high-index waveguide 620.

In the case where the optical coupler 600 serves as an input optical coupler as previously discussed, an optical signal is provided to a wider portion of the inverse tapered high index waveguide 610 as shown by the dashed arrow line pointing to the right. The optical signal propagates in a substantially horizontal direction within the inverse tapered high index waveguide 610 towards the narrower portion. At the narrower portion of the inverse tapered high index waveguide 610, the optical signal, via evanescent wave coupling, is redirected in a substantially upward vertical direction towards and into the narrower portion of the tapered high index waveguide 620 to effectuate the optical vertical coupling. The narrower portion of the tapered high index waveguide 620 redirects the input optical signal in a substantially horizontal direction towards its wider portion for coupling into another device, such as an optical modulation waveguide of an optical modulator. The tapered high index waveguide 620 may be configured as a mode converter to change (e.g., decrease) a mode field diameter (e.g., spot size) of the input optical signal for efficient coupling into an optical modulation waveguide, as previously discussed. If the optical coupler 600 is implemented as an output optical coupler, the direction of the optical signal may be in the opposite direction (as shown by the dashed arrow line pointing to the left) and the mode field diameter (e.g., spot size) of the output optical signal may increase instead.

Figure 7:
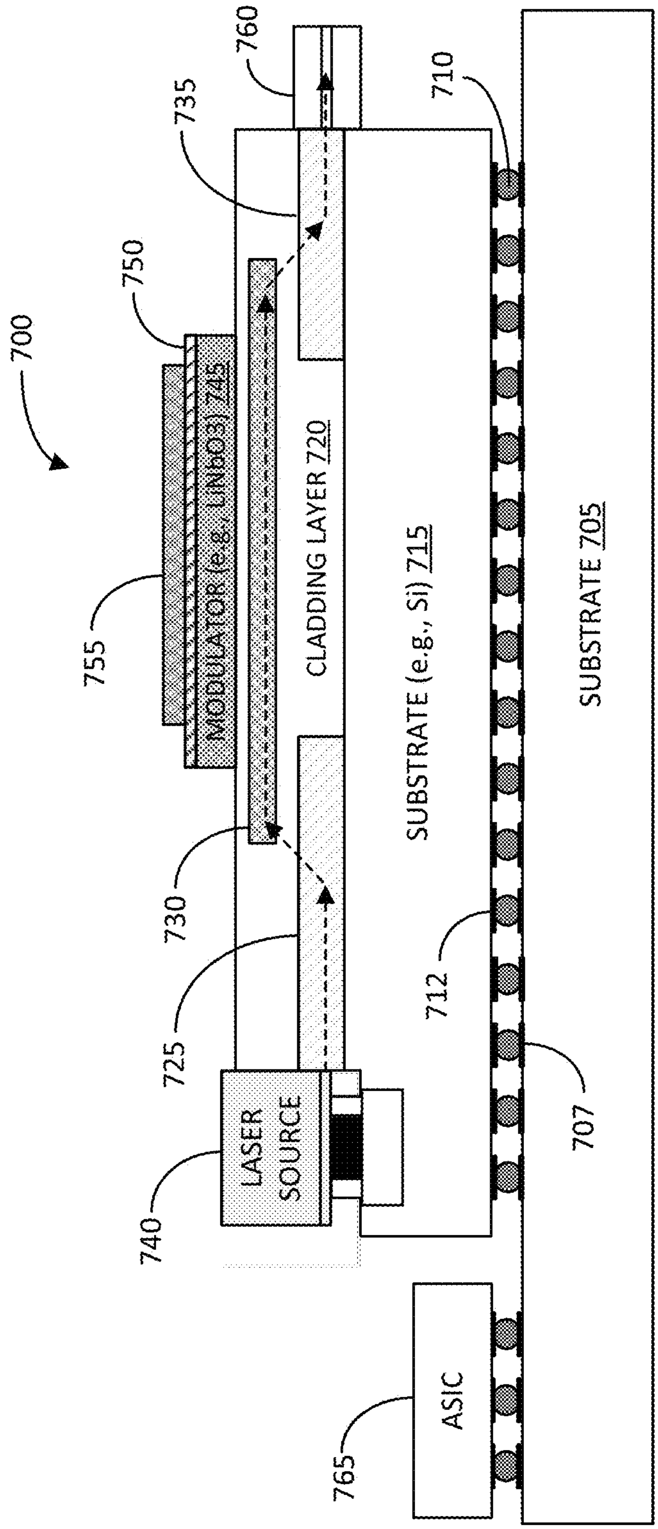
FIG. 7 illustrates a side sectional view of another example hybrid-integrated electro-optic (EO) modulator in accordance with another aspect of the disclosure.

FIG. 7 illustrates a side sectional view of another example hybrid-integrated electro-optic (EO) modulator 700 in accordance with another aspect of the disclosure. The EO hybrid-integrated modulator 700 comprises a substrate with metal redistribution layers 705, a chip-level substrate (e.g., Si) 715 including a set of metal traces 712 on its bottom surface coupled to a set of metal traces 707 on the top surface of the substrate 705. A set of one or more ASIC chips 765 are electrically connected to the hybrid-integrated modulator 700 (e.g., electrode 755) through the bottom substrate 705 and the upper substrate 715. The set of one or more ASIC chips 765 may be implemented as a digital ASIC, often referred to simply as "the DSP," and includes digital signal processing (DSP) functions for the receive and transmit directions. The EO modulator 700 further includes an input high index waveguide 725 and an output high index waveguide 735 disposed over the substrate 715.

Additionally, the EO modulator 700 includes an optical modulation (e.g., silicon nitride (SiN)) waveguide 730 optically coupled to the input and output high index waveguides 725 and 735. For example, the input high index waveguide 725 and first (e.g., left) end portion of the optical modulation waveguide 730 may be implemented as the inverse tapered and tapered high index waveguides 610 and 620 of the optical coupler 600, respectively. The output high index waveguide 725 and first (e.g., left) end portion of the optical modulation waveguide 730 may be implemented as the inverse tapered and tapered high index waveguides 620 and 610 of the optical coupler 600, respectively. A cladding (e.g., a dielectric including $SiO_2$ or polymer) layer 720 may be disposed over the input and output high index waveguides 725 and 735 and the substrate 715, and all around the modulation waveguide 730.

A laser source 740, such as a distributed feedback (DFB) laser, semiconductor optical amplifier (SOA), or a superluminescent diode (SLD), may be bonded on the substrate 715, and optically coupled to the input high index waveguide 725 to provide an input optical signal thereto, as indicated by the dashed arrow line. Per the discussion on the optical coupler 600, the input high index waveguide 725 redirects a substantially horizontally propagating input optical signal in an upward direction to a first (e.g., left) end portion of the optical modulation waveguide 730, as indicated by the dashed arrow line. The optical signal propagates in a substantially horizontal direction from the first (e.g., left) end portion to a second (e.g., right) end portion of the optical modulation waveguide 730, while being modulated by an RF signal as discussed further herein. Per the discussion on the optical coupler 650, the optical modulation waveguide 730 redirects the horizontal propagating modulated optical signal in a downward vertical direction to a first (e.g., left) end portion of the output high index waveguide 735, as indicated by the dashed arrow line. The output high index waveguide 735 redirects the vertical-propagating modulated optical signal in a substantially horizontal direction to a single-mode optical fiber 760 and/or some other device depending on application.

With regard to electrical modulation of the optical signal, the EO modulator 700 includes an electro-optical modulation layer (e.g., bulk LiNbO3 or TFLN) 745 disposed over the cladding layer 720. The EO modulator 700 also includes a low index buffer layer (e.g., $SiO_2$) 750 disposed over the EO modulation layer 745, the index buffer layer 750 between the optical modulator 745 and electrode 755 may be required to prevent excessive metal absorption losses. The electrode (electrical transmission line) 755 extends substantially parallel with the optical modulation waveguide 730. An RF driver (not shown in FIG. 7) generates an RF signal that is provided to the electrode 755. Due to the interaction between the RF signal on the electrode 755 and the EO modulation layer 745, the optical signal propagating via the modulation waveguide 730 gets modulated by the RF signal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An integrated electro-optical modulator, comprising:
- an optical modulation waveguide configured to modulate an optical signal with a received radio frequency (RF) signal to generate a modulated optical signal;
- an electrode configured to receive the RF signal;
- an input waveguide configured to:
  - receive the optical signal in a substantially horizontal direction; and
  - redirect the optical signal in a vertical direction towards the optical modulation waveguide;
- an output waveguide configured to:
  - receive the modulated optical signal in the vertical direction; and
  - redirect the modulated optical signal in the substantially horizontal direction;
- a first substrate;
- a first cladding layer disposed over the first substrate and the input waveguide, wherein a first portion of the electrode is situated between the optical modulator and the first cladding layer;
- a second substrate; and
- a second cladding layer disposed over the second substrate and the output waveguide, wherein a second portion of the electrode is situated between the optical modulator and the second cladding layer.

2. The integrated electro-optical modulator of claim 1, wherein the input waveguide includes a mirror or reflector configured to redirect the optical signal in the vertical direction.

3. The integrated electro-optical modulator of claim 1, wherein the input waveguide includes an optical coupler comprising:
- an inverse tapered waveguide including a first wider portion configured to receive the optical signal in the substantially horizontal direction, and a first narrower portion configured to redirect the optical signal in the vertical direction; and
- a tapered waveguide including a second narrower portion configured to receive the optical signal in the vertical direction and redirect the optical signal in the substantially horizontal direction towards a second wider portion of the tapered waveguide.

4. The integrated electro-optical modulator of claim 3, wherein the optical coupler is configured to decrease a mode field diameter of the optical signal.

5. The integrated electro-optical modulator of claim 1, wherein the output waveguide includes a mirror or reflector configured to redirect the optical signal in the substantially horizontal direction.

6. The integrated electro-optical modulator of claim 1, wherein the output waveguide includes an optical coupler comprising:
- an inverse tapered waveguide including a first wider portion configured to receive the modulated optical signal in the substantially horizontal direction, and a first narrower portion configured to redirect the modulated optical signal in the vertical direction; and
- a tapered waveguide including a second narrower portion configured to receive the optical signal in the vertical direction and redirect the optical signal in the substantially horizontal direction towards a second wider portion of the tapered waveguide.

7. The integrated electro-optical modulator of claim 6, wherein the optical coupler is configured to increase a mode field diameter of the modulated optical signal.

8. The integrated electro-optical modulator of claim 1, wherein the optical modulator includes a mirror or reflector configured to redirect the optical signal received from the input waveguide for substantial horizontal propagation via the optical modulation waveguide.

9. The integrated electro-optical modulator of claim 8, further comprising a lens configured to decrease a mode field diameter of the optical signal propagating from the input waveguide towards the mirror or reflector of the optical modulator.

10. The integrated electro-optical modulator of claim 1, wherein the optical modulator includes a mirror or reflector configured to redirect the modulated optical signal propagating via the optical modulation waveguide in a vertical direction.

11. The integrated electro-optical modulator of claim 1, further comprising:

an electro-optical (EO) modulation layer bonded to the first and second cladding layers; and a modulation waveguide optically coupled to the EO modulation layer.

12. The integrated electro-optical modulator of claim 11, wherein an index buffer layer is disposed between the electrode and the optical modulation material.

13. The integrated electro-optical modulator of claim 11, wherein the RF electrode is electromagnetically coupled to the EO modulation layer.

14. The integrated electro-optical modulator of claim 1, wherein the first substrate is disposed over and attached to a third substrate including a redistribution layer.

15. The integrated electro-optical of claim 14, further comprising a set of one or more integrated circuit chips disposed over the third substrate, wherein the set of one or more integrated chips are electrically coupled to the electrode via the first and third substrates.

16. The integrated electro-optical modulator of claim 1, further comprising a laser source configured to generate the input optical signal, wherein the laser source is disposed over the first substrate.

17. The integrated electro-optical modulator of claim 1, further comprising a radio frequency (RF) driver configured to generate the RF signal, wherein the RF driver is disposed over the first substrate.

18. An integrated electro-optical modulator, comprising:

an optical modulation waveguide configured to modulate an optical signal with a received radio frequency (RF) signal to generate a modulated optical signal;

an electrode configured to receive the RF signal;

an input waveguide configured to:

receive the optical signal in a substantially horizontal direction; and redirect the optical signal in a vertical direction towards the optical modulation waveguide;

an output waveguide configured to:

receive the modulated optical signal in the vertical direction; and redirect the modulated optical signal in the substantially horizontal direction;

a first substrate;

a first cladding layer disposed over the first substrate and the input waveguide;

a second substrate; and a second cladding layer disposed over the second substrate and the output waveguide, wherein the optical modulator is situated between the first substrate and the second substrate, and wherein the electrode is disposed over the optical modulator.

19. The integrated electro-optical modulator of claim 18, further comprising:

an electro-optical (EO) modulation layer bonded to the first and second cladding layers; and a modulation waveguide optically coupled to the EO modulation layer.

20. The integrated electro-optical modulator of claim 19, wherein an index buffer layer is disposed between the electrode and the optical modulation material.

21. The integrated electro-optical modulator of claim 19, wherein the RF electrode is electromagnetically coupled to the EO modulation layer.

22. The integrated electro-optical modulator of claim 19, wherein the first substrate is disposed over and attached to a third substrate including a redistribution layer.

23. The integrated electro-optical of claim 22, further comprising a set of one or more integrated circuit chips disposed over the third substrate, wherein the set of one or more integrated chips are electrically coupled to the electrode via the first and third substrates.

* * * * *